(12) United States Patent
Lin et al.

(10) Patent No.: US 7,443,595 B2
(45) Date of Patent: Oct. 28, 2008

(54) OPTICAL SYSTEM FOR PROJECTOR AND IMAGING METHOD THEREOF

(75) Inventors: Lung-Ta Lin, Taipei County (TW); Tsang-Chi Wang, Tainan (TW); Ming-Kuen Lin, Yunlin County (TW)

(73) Assignees: QISDA Corporation, Taoyuan (TW); BENQ Corporation, Taipei (TW)

( * ) Notice: Subject to any disclaimer, the term of this patent is extended or adjusted under 35 U.S.C. 154(b) by 67 days.

(21) Appl. No.: 11/439,700

(22) Filed: May 23, 2006

(65) Prior Publication Data
US 2006/0268245 A1 Nov. 30, 2006

(30) Foreign Application Priority Data
May 24, 2005 (TW) .............................. 94116854 A

(51) Int. Cl.
*G02B 27/00* (2006.01)
(52) U.S. Cl. ...................................................... 359/649
(58) Field of Classification Search ......... 359/649–651; 353/37
See application file for complete search history.

(56) References Cited

U.S. PATENT DOCUMENTS

| | | | | |
|---|---|---|---|---|
| 5,369,521 A | * | 11/1994 | Yoshino | 359/196 |
| 5,583,696 A | * | 12/1996 | Takahashi | 359/637 |
| 5,808,805 A | * | 9/1998 | Takahashi | 359/651 |
| 5,861,997 A | * | 1/1999 | Takahashi | 359/727 |
| 5,999,333 A | * | 12/1999 | Takahashi | 359/726 |
| 7,068,436 B2 | * | 6/2006 | Gruner et al. | 359/649 |

FOREIGN PATENT DOCUMENTS

| | | |
|---|---|---|
| CN | 1524194 | 8/2004 |
| CN | 1561468 A | 1/2005 |

* cited by examiner

*Primary Examiner*—Darryl J Collins
(74) *Attorney, Agent, or Firm*—Quintero Law Office

(57) ABSTRACT

An optical system for a projector and an imaging method thereof. A light beam from a light source passes through a first lens set and a second lens set sequentially. The light beam having passed through the second lens set is reflected by a first mirror to pass through the second lens set again and arrived at an imaging device. The light is reflected from the imaging device to a projection lens set to project the light beam onto a screen.

17 Claims, 9 Drawing Sheets

OPTICAL SYSTEM FOR PROJECTOR AND IMAGING METHOD THEREOF

BACKGROUND

The invention relates to an optical system for a projector and an imaging method thereof, and in particular to an optical system occupying relatively smaller space by enabling light to pass through a lens set twice.

A light beam in a projector passes through a color wheel to emit a desired primary color light, such as red, blue or green light. The primary color light passes through a series of optical lenses and is projected onto a digital micromirror device which determines pixel positions according to a control system. The primary color light beam from the digital micromirror device is projected onto a screen by a projection lens set. The color wheel creates light beams of three primary colors, and the digital micromirror device determines pixel positions of the primary color light beams respectively to form an image.

Projectors are substantially divided into two types according to the position of the optical axis of the digital micromirror device and the axis of projection lens set:

In the first type, the optical axis of the digital micromirror device is aligned with the axis of the projection lens set as shown in FIG. 1. In the second type, the optical axis of the digital micromirror device has a predetermined offset angle with respect to the axis of the projection lens set as shown in FIG. 2.

In FIG. 1, a light beam from a luminous body 12 is focused by a condenser 14, passes through a color wheel 16 to create a desired primary color light. The light is made uniformed by a light integrator 18, and passes through a first lens 22, a second lens 24 and a prism 90 comprising two triangular prisms. Prism 90 reflects the light beam to a digital micromirror device 60 which reflects the light beam to the projection lens set 70. In the described structure, as the prism 90 reflects the light beam to the digital micromirror device 60 and allows the light beam reflected by the digital micromirror device 60 to pass therethrough, the digital micromirror device 60, projection lens set 70 and prism 90 are substantially aligned to save space. The light beam reflected by the digital micromirror device 60 has no deviation from the projection lens set 70 so that the light beam from the digital micromirror device 60 can be projected onto a screen via the projection lens set 70. The prism 90, however, is costly and has considerable weight, and is difficult to ship.

In FIG. 2, a light beam passes through a first lens 22, a second lens 24 and a third lens 30. A mirror 80 reflects the light beam to the digital micromirror device 60. As the light beam cannot pass through the mirror 80, the digital micromirror device 60 must have an offset angle with respect to the projection lens set 70 to prevent interference. Although no prism is used in the structure, the configuration of the digital micromirror device 60, the projection lens set 70 and the mirror 80 may possibly occupy more volume.

SUMMARY

An optical system according to an embodiment of the invention comprises a light source, a first lens set, a second lens set, a first mirror, an imaging device, and a projection lens set. A light beam from the light source passes through the first lens set and the second lens set sequentially, and after passing through the second lens set is reflected by the first mirror to pass through the second lens set again and finally arriving at the imaging device which reflects the light beam to the projection lens set for projection onto a screen.

The first lens set comprises a first lens and a second lens, and the light beam from the light source passes through the first lens and the second lens sequentially.

The first lens set further comprises a second mirror reflecting the light beam, which passes through the first and second lenses, to pass through the second lens set.

The light source comprises a luminous body, a condenser and a light integrator. The light beam from the luminous body passes the condenser and enters the light integrator.

The light source further comprises a color wheel. The light beam having passed the condenser passes the color wheel to create primary color light which enters the light integrator. The effective focal length of the first lens is greater than 24.5 mm and less than 26.5 mm. The effective focal length of the second lens' is greater than 28 mm and less than 30 mm.

The second lens set comprises a third lens. The light beam having passed the first lens set passes through the third lens and is reflected by the first mirror to pass through the third lens again. The effective focal length is greater than 76.5 mm and less than 78.5 mm.

The imaging device comprises a digital micromirror device.

An imaging method of an optical system for a projector comprises the following steps:

A light source is provided.

A light beam from the light source passes through a first lens set. The light beam having passed through the first lens set passes through a second lens set. The light beam having passed through the second lens set is reflected by a first mirror to pass through the second lens set again and arrive at an imaging device. The light beam having arrived at the imaging device is reflected to a projection lens set for projection onto a screen.

The first lens set comprises a lens assembly and a second mirror. The imaging method further comprises the following steps:

The light beam from the light source passes through the lens assembly and is reflected by the second mirror to pass through the second lens set.

The imaging method further comprises the following steps:

The plane on which the imaging device is positioned is defined as a standard plane on which an x axis and a y axis normal to the x axis are defined.

A first optical path, along which the light beam from the light source travels through the first lens set to the second mirror, is defined.

A second optical path, along which the light beam from the second mirror travels through the second lens set to the first mirror, is defined.

A third optical path, along which the light beam from the first mirror travels through the second lens set to the imaging device, is defined.

A fourth optical path, along which the light beam from the imaging device travels to the projection lens set, is defined.

The angle between the first optical path and the x axis is greater than 167° and less than 171°, and the angle between the first optical path and the y axis is greater than 93° and less than 97°.

The angle between the second optical path and the x axis is greater than 85° and less than 890, and the angle between the second optical path and the y axis is greater than 850 and less than 890.

The angle between the third optical path and the x axis is greater than 71.5° and less than 75.5°, and the angle between the third optical path and the y axis is greater than 65.50 and less than 69.5°.

The angle between the fourth optical path and the x axis is greater than 88° and less than 92°, and the angle between the fourth optical path and the y axis is greater than 83° and less than 87°.

BRIEF DESCRIPTION OF THE DRAWINGS

The invention can be more fully understood by reading the subsequent detailed description and examples with references made to the accompanying drawings, wherein:

FIG. 3b is the right-hand side of FIG. 3a;

FIG. 4 is a developed view of optical path of FIG. 3a;

DETAILED DESCRIPTION

Figure 1:
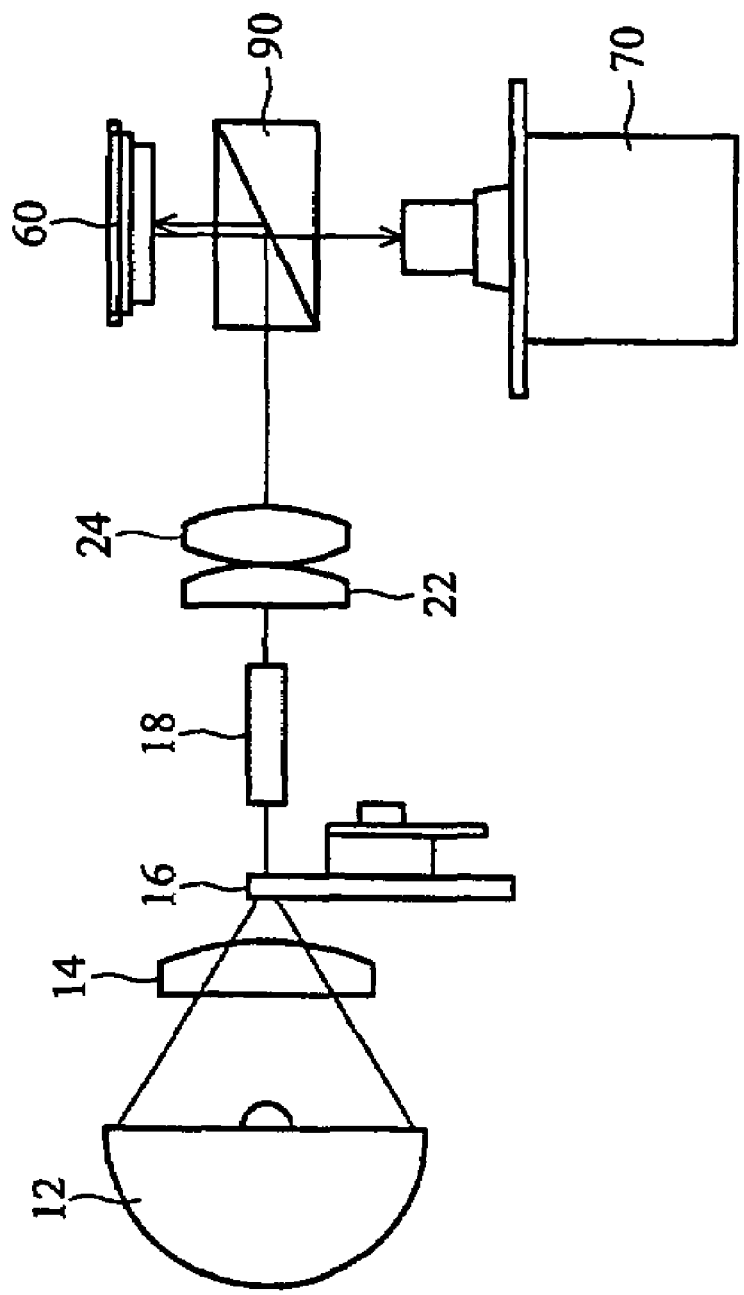
FIG. 1 is schematic view of an optical system of a conventional projector.
Figure 2:
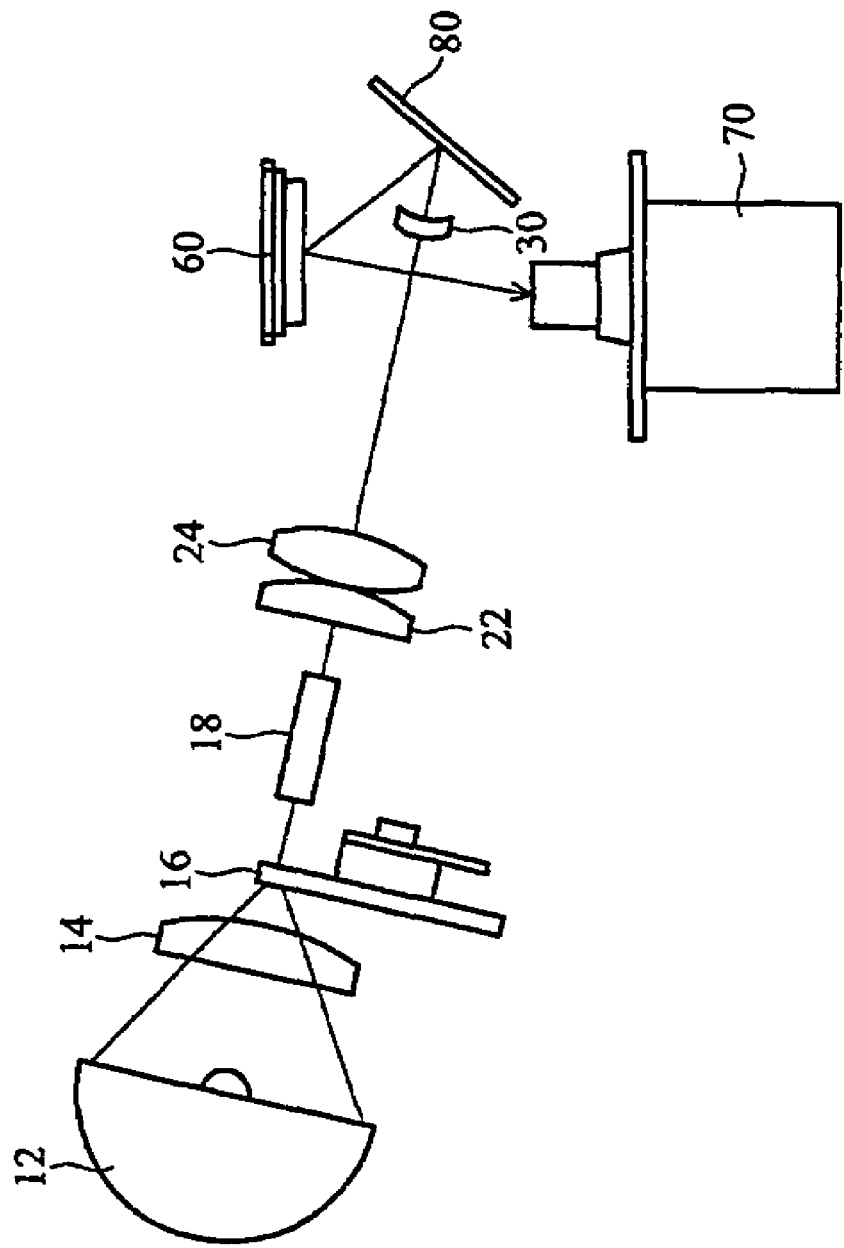
FIG. 2 is a schematic view of an optical system of another conventional projector.
Figure 3A:
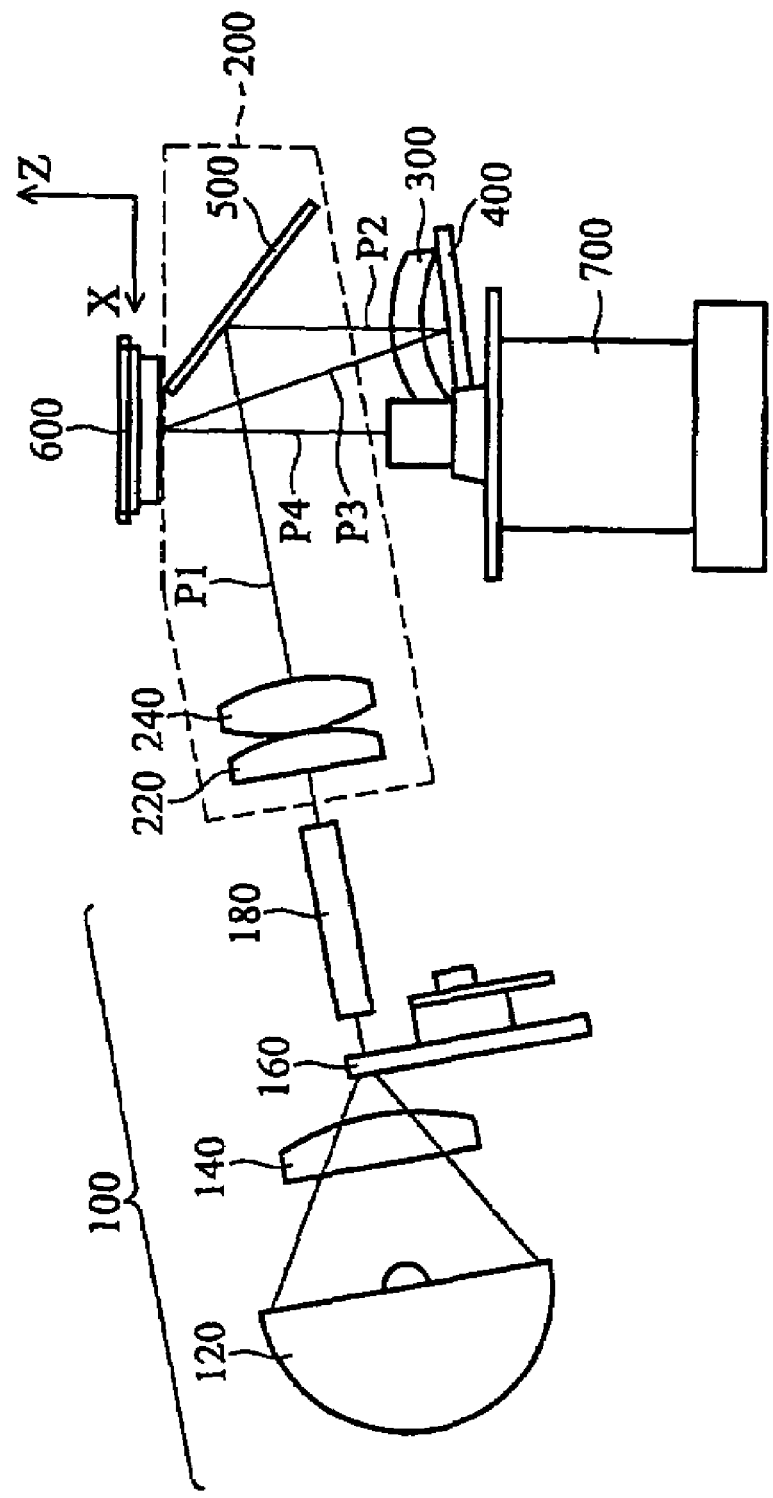
FIG. 3a is a schematic view of an optical system of the invention.
Figure 3B:
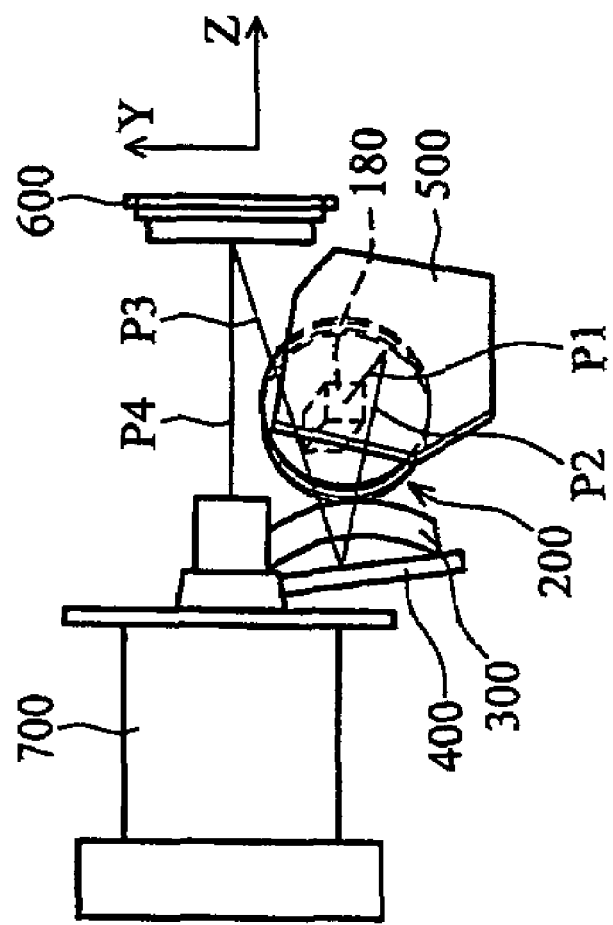
Figure 4:
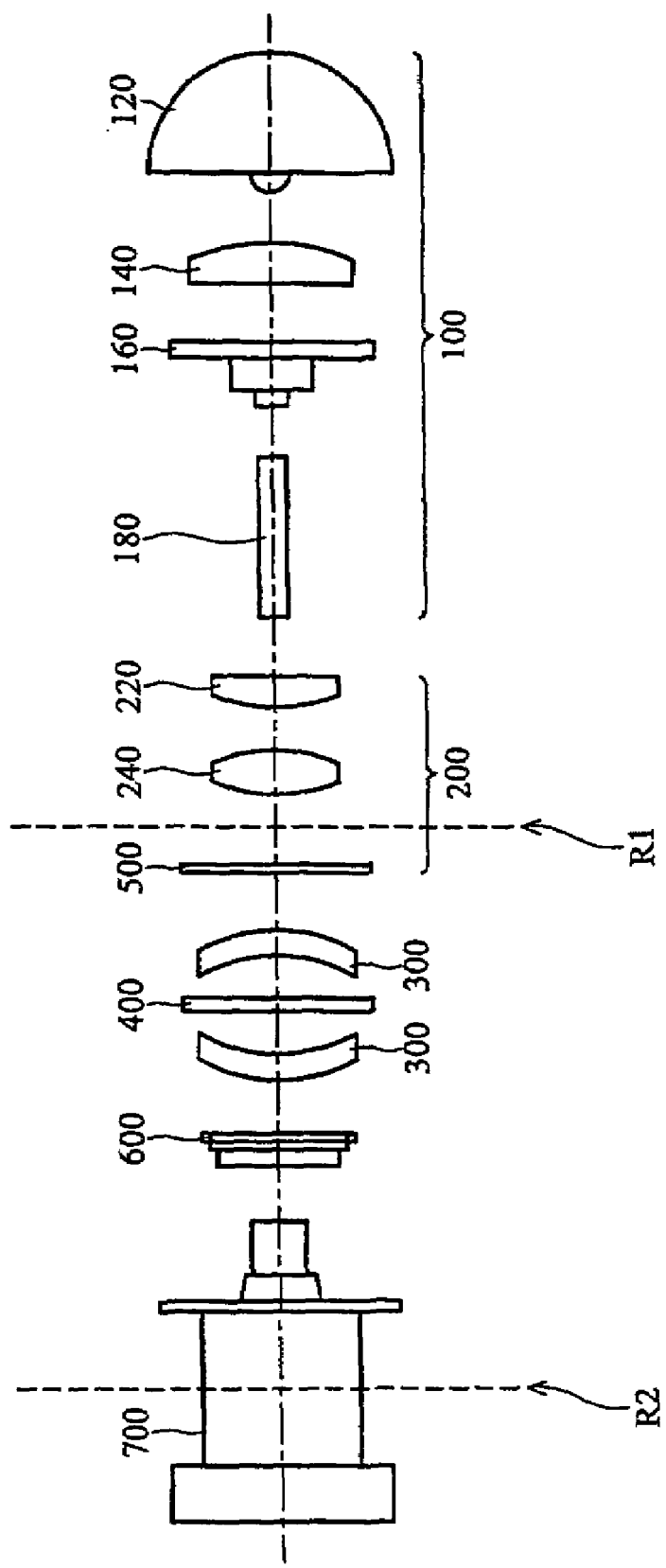

Referring to FIGS. 3a, 3b and 4, a preferred embodiment of the optical system of the invention comprises a light source 100, a first lens set 200, a second lens set, a first mirror 400, an imaging device (digital micromirror device 600) and a projection lens set 700. Although in this embodiment the imaging device is a digital micromirror device, a reflective liquid crystal screen or other reflective imaging devices can also be applicable.

The light source 100 comprises a luminous body 120, a condenser 140, a color wheel 160 and a light integrator 180. The first lens set comprises a first lens 220, a second lens 240 and a second mirror 500. The second lens set comprises a third lens 300.

The luminous body 120 can be an arc bulb behind which a paraboloid mirror or sphere mirror is disposed to reflect light. A light beam from luminous body 120 is converged by the condenser 140 (an expander is also applicable for diffusing the light beam). The converged light beam passes through a color wheel 160 to create desired primary color light beam (red, blue or green). The primary color light beam enters a light integrator 180 making the intensity and projection path uniform.

The uniform light beam enters into the first lens set 200. The light beam passes through the first lens 220 and the second lens 240 sequentially and converges in a position behind the second lens 240, which is referred to as a first relay position R1.

The light beam from the first relay position R1 is reflected by the second mirror 500 to pass through the third lens 300. The light beam having passed the third lens 300 is reflected by the first mirror 400 to pass through the third lens 300 again and arrive at the digital micromirror device 600 which reflects the light beam to the projection lens set 700 and converges in an appropriate position which is referred to as a second relay position R2. The projection lens set 700 projects the light beam onto a screen (not shown).

In this embodiment, the effective focal length of the first lens is greater than 24.5 mm and less than 26.5 mm. The effective focal length of the second lens is greater than 28 mm and less than 30 mm. The effective focal length of the third lens is greater than 76.5 mm and less than 78.5 mm.

In addition, the plane on which the digital micromirror device 600 is positioned is defined as a standard plane. An x axis and a y axis normal to the x axis are defined on the standard plane as shown in FIGS. 3a and 3b. A z axis is defined by the x axis and the y axis according to the right hand rule. A first optical path P1 is defined, along which the light beam from the light integrator 180 travels through the first and second lenses 220 and 240 to the second mirror 500. A second optical path P2 is defined, along which the light beam from the second mirror 500 travels through the third lens 300 to the first mirror 400. A third optical path P3 is defined, along which the light beam from the first mirror 400 travels through the third lens 300 to the digital micromirror device 600. A fourth optical path P4 is defined, along which the light beam from the digital micromirror device 600 travels to the projection lens set 700.

Figure 5A:
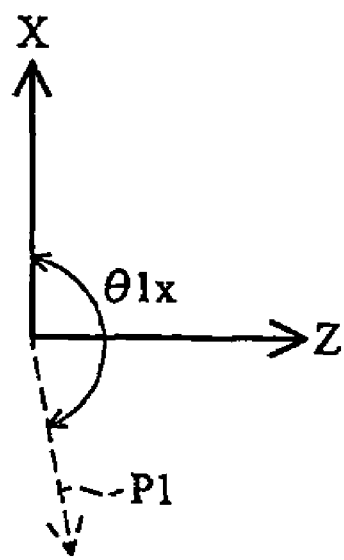
FIG. 5a depicts an angle between the first optical path and the x axis.
Figure 5B:
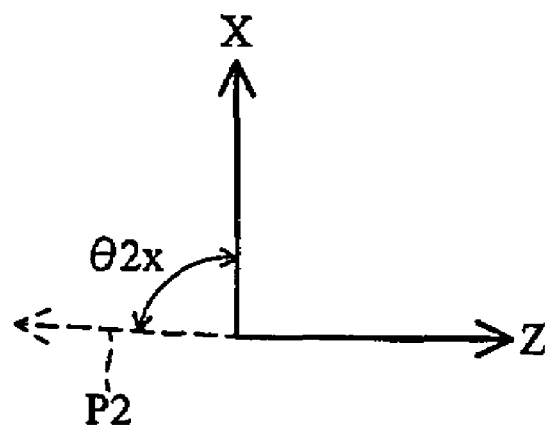
FIG. 5b depicts an angle between the second optical path and the x axis.
Figure 5C:
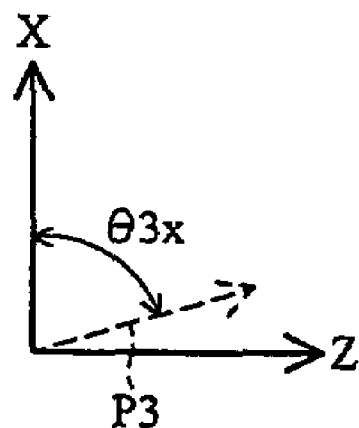
FIG. 5c depicts an angle between the third optical path and the x axis.
Figure 5D:
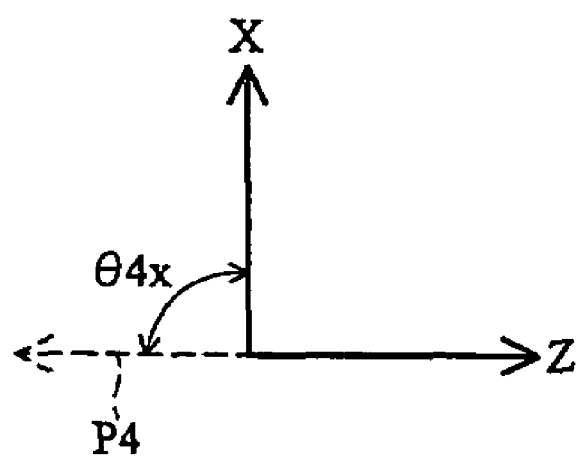
FIG. 5d depicts an angle between the fourth optical path and the x axis.
Figure 6A:
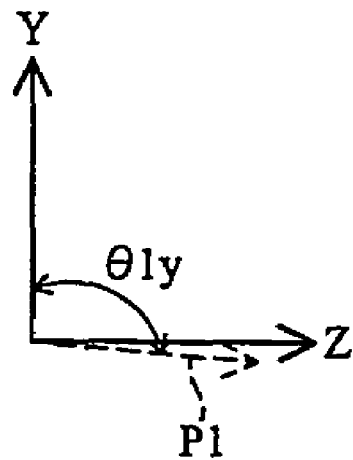
FIG. 6a depicts an angle between the first optical path and the y axis.
Figure 6B:
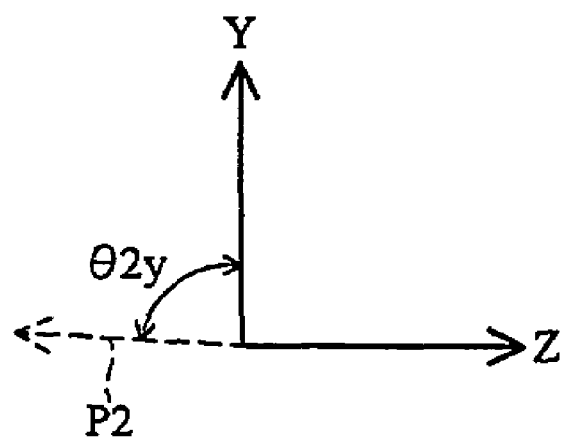
FIG. 6b depicts an angle between the second optical path and the y axis.
Figure 6C:
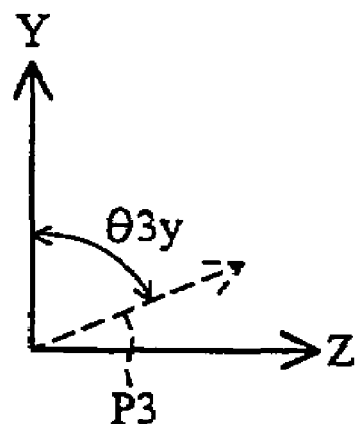
FIG. 6c depicts an angle between the third optical path and the y axis.
Figure 6D:
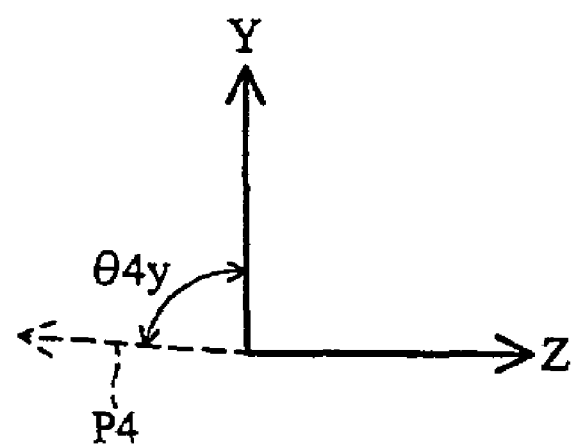
FIG. 6d depicts an angle between the fourth optical path and the y axis.

In this preferred embodiment, an angle $\theta 1x$ between the first optical path P1 and the X axis is greater than 167° and less than 171°, and an angle $\theta 1y$ between the first optical path P1 and the y axis is greater than 93° and less than 97° as shown in FIGS. 5a and 6a. An angle $\theta 2x$ between the second optical path P2 and the X axis is greater than 85° and less than 89°, and an angle $\theta 2y$ between the second optical path P2 and the y axis is greater than 85° and less than 89° as shown in FIGS. 5b and 6b. An angle $\theta 3x$ between the third optical path P3 and the X axis is greater than 71.5° and less than 75.5°, and an angle $\theta 3y$ between the third optical path P3 and the y axis is greater than 65.5° and less than 69.5° as shown in FIGS. 5c and 6c. An angle $\theta 4x$ between the fourth optical path P4 and the X axis is greater than 88° and less than 92°, and an angle $\theta 4y$ between the fourth optical path P4 and the y axis is greater than 830 and less than 87° as shown in FIGS. 5d and 6d.

In another embodiment of the invention, the second mirror 500 is removed, and the light beam having passed through the first and second lenses 220 and 240 passes through the third lens 300 directly and is reflected by the first mirror 400 to pass through the third lens 300.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical system for a projector, comprising:
   a light source;
   a first lens set;
   a second lens set;

a first plane mirror;
an imaging device; and
a projection lens set, wherein a light beam from the light source passes through the first lens set and the second lens set sequentially, and the light beam having passed through the second lens set is reflected by the first plane mirror to pass through the second lens set again and arrive at the imaging device and the projection lens set sequentially.

2. The optical system as claimed in claim 1, wherein the first lens set comprises a first lens and a second lens, and the light beam from the light source passes through the first lens and the second lens sequentially.

3. The optical system as claimed in claim 2, wherein the first lens set further comprises a second mirror reflecting the light beam, which passes through the first and second lenses, to pass through the second lens set.

4. The optical system as claimed in claim 1, wherein the light source comprises a luminous body, a condenser and a light integrator, and the light beam from the illusionary body passes through the condenser and enters the light integrator.

5. The optical system as claimed in claim 4, wherein the light source further comprises a color wheel, the light beam having passed through the condenser passes through the color wheel to create primary color light which enters the light integrator.

6. The optical system as claimed in claim 2, wherein the effective focal length of the first lens is greater than 24.5 mm and less than 26.5 mm, and the effective focal length of the second lens is greater than 28 mm and less than 30 mm.

7. The optical system as claimed in claim 1, wherein the second lens set comprises a third lens, and the light beam having passed through the first lens set passes through the third lens and is reflected by the first plane mirror to pass through the third lens again.

8. The optical system as claimed in claim 7, wherein the effective focal length is greater than 76.5 mm and less than 78.5 mm.

9. The optical system as claimed in claim 1, wherein the imaging device comprises a digital micromirror device.

10. An imaging method of an optical system for a projector, comprising the following steps:
providing a light source;
enabling a light beam from the light source to pass through a first lens set;
enabling the light beam having passed through the first lens set to pass through a second lens set;
reflecting the light beam having passed through the second lens set by a first plane mirror to pass through the second lens set again to arrive at an imaging device; and
delivering the light beam arrived at the imaging device to a projection lens set projecting the light beam onto a screen.

11. The imaging method as claimed in claim 10, wherein the first lens set comprises a lens assembly and a second mirror.

12. The imaging method as claimed in claim 11 further comprising the step of enabling the light beam from the light source to pass through the lens assembly and be reflected by the second mirror.

13. An imaging method of an optical system for a projector, comprising the following steps:
providing a light source;
enabling a light beam from the light source to pass through a first lens set comprising a lens assembly and a second mirror, wherein the light beam passes through the lens assembly and is reflected by the second mirror;
enabling the light beam having passed through the first lens set to pass through a second lens set;
reflecting the light beam having passed through the second lens set by a first mirror to pass through the second lens set again to arrive at an imaging device;
delivering the light beam arrived at the imaging device to a projection lens set projecting the light beam onto a screen, the method further comprising the steps of:
defining the plane on which the imaging device is positioned as a standard plane on
which an x axis and a y axis normal to the x axis are defined;
defining a first optical path along which the light beam from the light source travels through the lens assembly to the second mirror;
defining a second optical path along which the light beam from the second mirror travels through the second lens set to the first mirror;
defining a third optical path along which the light beam from the first mirror travels through the second lens set to the imaging device; and
defining a fourth optical path along which the light beam from the imaging device travels to the projection lens set.

14. The imaging method as claimed in claim 13, wherein the angle between the first optical path and the x axis is greater than 167° and less than 171°, and the angle between the first optical path and the y axis is greater than 93° and less than 97°.

15. The imaging method as claimed in claim 13, wherein the angle between the second optical path and the x axis is greater than 85° and less than 89°, and the angle between the second optical path and the y axis is greater than 85° and less than 89°.

16. The imaging method as claimed in claim 13, wherein the angle between the third optical path and the x axis is greater than 71.5° and less than 75.5°, and the angle between the third optical path and the y axis is greater than 65.5° and less than 69.5°.

17. The imaging method as claimed in claim 13, wherein the angle between the fourth optical path and the x axis is greater than 88° and less than 92°, and the angle between the fourth optical path and the y axis is greater than 83° and less than 87°.

* * * * *